Patented Aug. 24, 1954

2,687,424

UNITED STATES PATENT OFFICE 2,687,424

ORGANOSILICON NITRILES AND THEIR DERIVATIVES

Leo H. Sommer, State College, Pa., assignor to Dow Corning Corporation, Midland, Mich., a corporation of Michigan No Drawing. Application March 31, 1953, Serial No. 346,052

5 Claims. (Cl. 260—448.2)

This invention relates to organosilicon nitriles and the acids derived therefrom.

It is the object of this invention to prepare novel organosilicon compounds which contain both polar and non-polar groupings in the molecule. Another object is to prepare novel compounds which are useful as solvents.

This invention relates to compounds of the formula $R_3Si(CH_2)_nOCH_2CH_2CN$ where R is any saturated aliphatic hydrocarbon or any monocyclic aryl hydrocarbon radical and where $n$ is the integer 1 or an integer from 3 to 5 inclusive. This invention further relates to the acids of the formula $R_3Si(CH_2)_nOCH_2CH_2COOH$ where R and $n$ are as above indicated.

The compounds of this invention are prepared by reacting alcohols of the formula $R_3Si(CH_2)_nOH$ with acrylonitrile in the presence of benzyltrimethyl ammonium hydroxide. An addition reaction takes place whereby the hydroxy group of the alcohol adds to the double bond of the acrylonitrile to produce the nitrile ethers of this invention. The acids of this invention are obtained from the nitriles by hydrolyzing the nitrile group in the presence of an acid catalyst. Hydrochloric acid is the preferred hydrolysis catalyst.

The alcohols which are employed as starting materials in this invention may be prepared in a variety of ways. Those alcohols where $n$ is 1 are best prepared by reacting $R_3SiCH_2Cl$ with potassium acetate to form compounds of the formula $R_3SiCH_2OOCCH_3$ and thereafter hydrolyzing them to the corresponding alcohols. Those alcohols in which $n$ is 3 to 5 are best prepared by the methods set forth in the copending application of John L. Speier, Serial No. 176,071, filed July 26, 1950, now Patent 2,629,727. Briefly, one of the methods described therein comprises reacting a compound of the formula $R_3SiO(CH_2)_nCl$ with $R_3SiCl$ in the presence of an alkali metal to give products of the formula $R_3SiO(CH_2)_nSiR_3$. These materials are then hydrolyzed to give alcohols of the type employed herein.

The compounds of this invention contain both a polar group and an ether linkage thereby making them solvents for a wide variety of compounds such as alkyd resins, polyamide resins, and polysiloxane resins.

The following examples are illustrative only and should not be construed as limiting the invention which is properly delineated in the appended claims.

EXAMPLE 1

97 g. of acrylonitrile was added slowly with stirring over a period of 1½ hours to a solution of 15 ml. of benzyl trimethyl ammonium hydroxide in 156 g. of trimethylsilylmethanol. During addition of the nitrile, it was necessary to cool the reaction mixture for a brief period in tap water. After addition of the nitrile was complete, the flask was heated at a temperature of 96° C. on a water bath for four hours. The liquid product was poured into two volumes of chloroform, and 300 ml. of ether was then added to precipitate any polymerized acrylonitrile. The solution was filtered and then washed with 300 ml. of saturated sodium chloride solution containing 30 ml. of concentrated hydrochloric acid and then with 300 ml. of sodium chloride solution containing sodium carbonate. The aqueous washes were extracted with ether and all the organic material was combined and dried over sodium carbonate. Upon distillation there was obtained 158 g. of the product 3-(trimethylsilylmethoxy) propionitrile, [Me$_3$SiCH$_2$OCH$_2$CH$_2$CN]. This maetrial boiled at 98° C. at 20 mm. pressure and has a refractive index at 20° C. of 1.4245.

EXAMPLE 2

When the alcohols shown in the table below are reacted with acrylonitrile in the presence of benzyltrimethyl ammonium hydroxide in the manner of Example 1, the nitriles shown in the table below are obtained.

Table

| Alcohols | Nitriles |
|---|---|
| Me$_3$Si(CH$_2$)$_3$OH | Me$_3$Si(CH$_2$)$_3$O(CH$_2$)$_2$CN |
| C$_6$H$_5$Et$_2$Si(CH$_2$)$_4$OH | C$_6$H$_5$Et$_2$Si(CH$_2$)$_4$O(CH$_2$)$_2$CN |
| C$_{18}$H$_{37}$Me$_2$Si(CH$_2$)$_5$OH | C$_{18}$H$_{37}$Me$_2$Si(CH$_2$)$_5$O(CH$_2$)$_2$CN |
| (MeC$_6$H$_4$)Me$_2$Si(CH$_2$)$_3$OH | (MeC$_6$H$_4$)Me$_2$Si(CH$_2$)$_3$O(CH$_2$)$_2$CN |
| (C$_6$H$_{10}$)Me$_2$Si(CH$_2$)$_3$OH | (C$_6$H$_{10}$)Me$_2$Si(CH$_2$)$_3$O(CH$_2$)$_2$CN |
| (C$_6$H$_5$CH$_2$)Me$_2$Si(CH$_2$)$_3$OH | (C$_6$H$_5$CH$_2$)Me$_2$Si(CH$_2$)$_3$O(CH$_2$)$_2$CN |

EXAMPLE 3

A mixture of 83 g. of 3-(trimethylsilylmethoxy) propionitrile, 60 ml. of concentrated hydrochloric acid and 90 ml. of glacial acetic acid was refluxed for two hours. 90 ml. more of acetic acid was added and refluxing was continued for ½ hour longer. The solution was then poured into water, shaken, and allowed to stand overnight.

The organic layer was drawn off and washed 3 times with 35 ml. portions of saturated NaCl solution. The organic matter was then dissolved in 50 ml. of ether and dried over anhydrous sodium sulfate. The ether solution was fractionated and there was obtained the acid 3-(trimethylsilylmethoxy) propionic acid

[Me$_3$SiCH$_2$OCH$_2$CH$_2$COOH]

This material boiled at 116–117° C. at 8 mm. pressure and had a refractive index at 20° C. of 1.4300. The acid was found to have a neutral equivalent of 173 while the calculated neutral equivalent is 176.

EXAMPLE 4

When the nitriles of Example 2 are hydrolyzed in the manner of Example 3, the acids shown below are obtained. Each acid was derived from the corresponding nitrile of the table.

$Me_3Si(CH_2)_3O(CH_2)_2COOH$
$C_6H_5Et_2Si(CH_2)_4O(CH_2)_2COOH$
$C_{18}H_{37}Me_2Si(CH_2)_5O(CH_2)_2COOH$
$(MeC_6H_4)Me_2Si(CH_2)_3O(CH_2)_2COOH$
$(C_6H_{10})Me_2Si(CH_2)_3O(CH_2)_2COOH$
$(C_6H_5CH_2)Me_2Si(CH_2)_3O(CH_2)_2COOH$

That which is claimed is:

1. A compound of the formula $$R_3Si(CH_2)_nOCH_2CH_2CN$$

where R is selected from the group consisting of saturated aliphatic hydrocarbon radicals and monocyclic aryl hydrocarbon radicals and $n$ is an integer of the group consisting of 1, 3, 4, and 5.

2. $Me_3SiCH_2OCH_2CH_2CN$.

3. A method comprising hydrolyzing compounds of the formula $R_3Si(CH_2)_nOCH_2CH_2CN$ where R is of the group consisting of saturated aliphatic hydrocarbon and monocyclic aryl hydrocarbon radicals and $n$ is an integer of the group 1, 3, 4, and 5, in the presence of an acid catalyst whereby compounds of the formula $$R_3Si(CH_2)_nOCH_2CH_2COOH$$

in which R and $n$ are as above defined, are produced.

4. A compound of the formula $$R_3Si(CH_2)_nOCH_2CH_2COOH$$

where R is of the group consisting of saturated aliphatic hydrocarbon radicals and monocyclic aryl hydrocarbon radicals and $n$ is an integer of the group consisting of 1, 3, 4, and 5.

5. $Me_3SiCH_2OCH_2CH_2COOH$.

References Cited in the file of this patent

UNITED STATES PATENTS

| Number | Name | Date |
|---|---|---|
| 2,589,445 | Sommer | Mar. 18, 1952 |
| 2,629,727 | Speier | Feb. 24, 1953 |